Oct. 23, 1962   J. P. LISSIMORE   3,059,786
STACKING APPARATUS
Filed Aug. 25, 1959   8 Sheets-Sheet 1

Oct. 23, 1962  J. P. LISSIMORE  3,059,786
STACKING APPARATUS
Filed Aug. 25, 1959  8 Sheets-Sheet 3

INVENTOR
John Philip Lissimore.
BY
Kurt Kelman
HIS AGENT

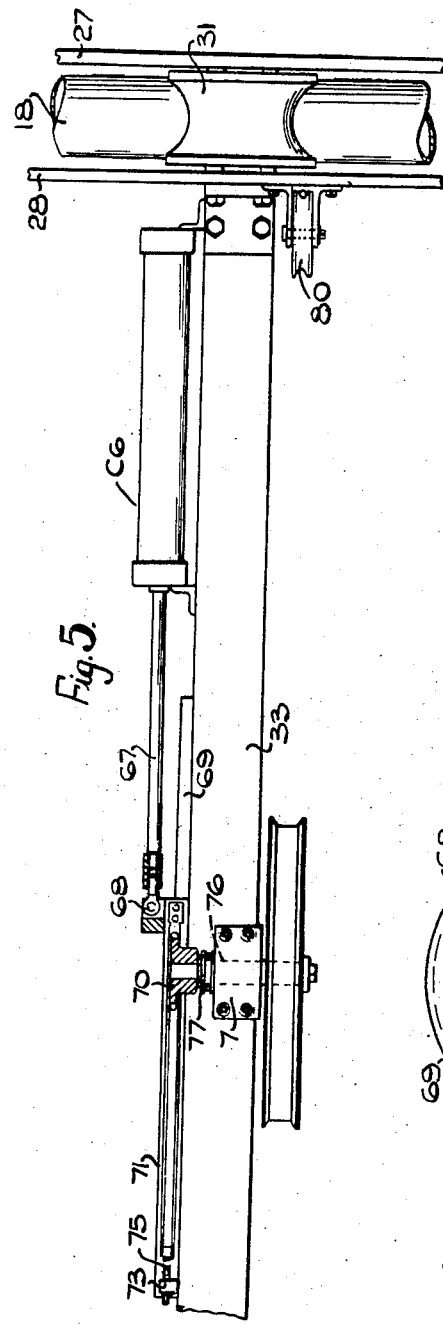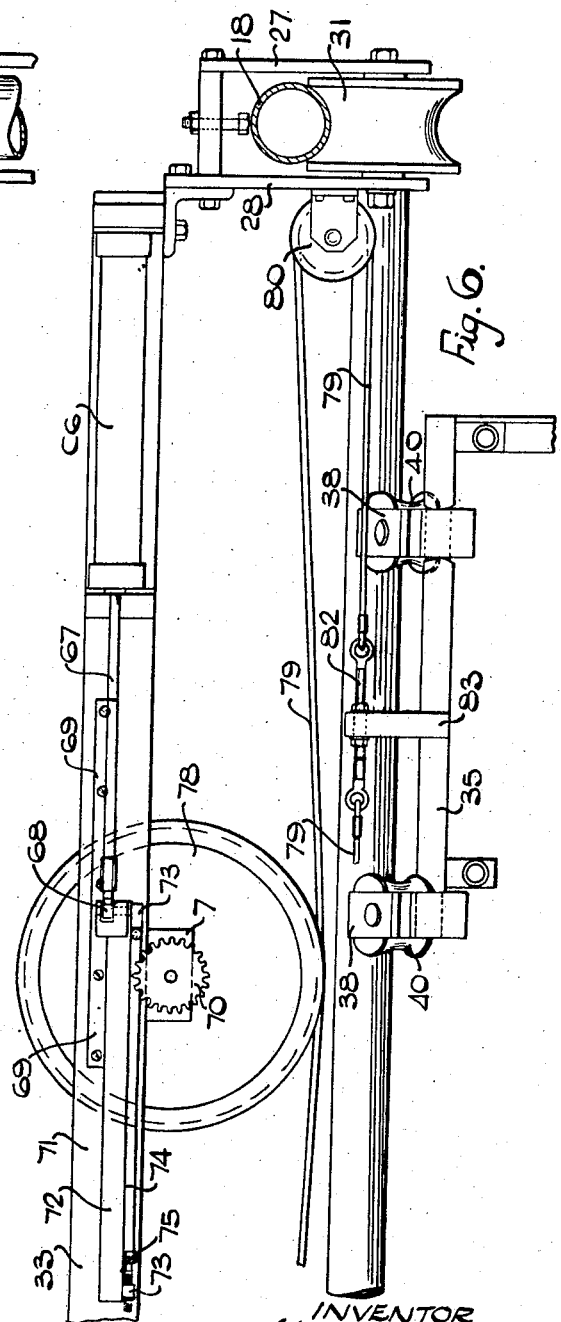

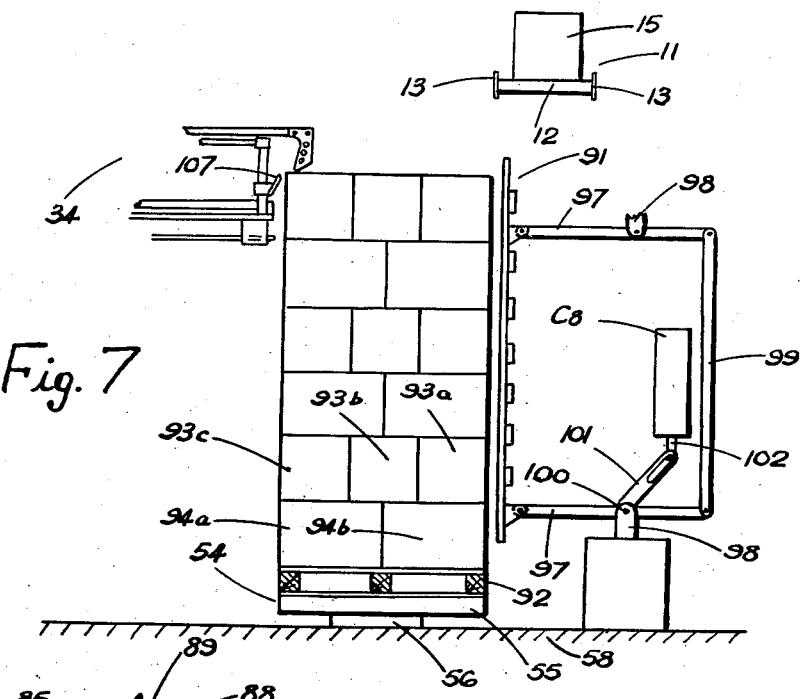
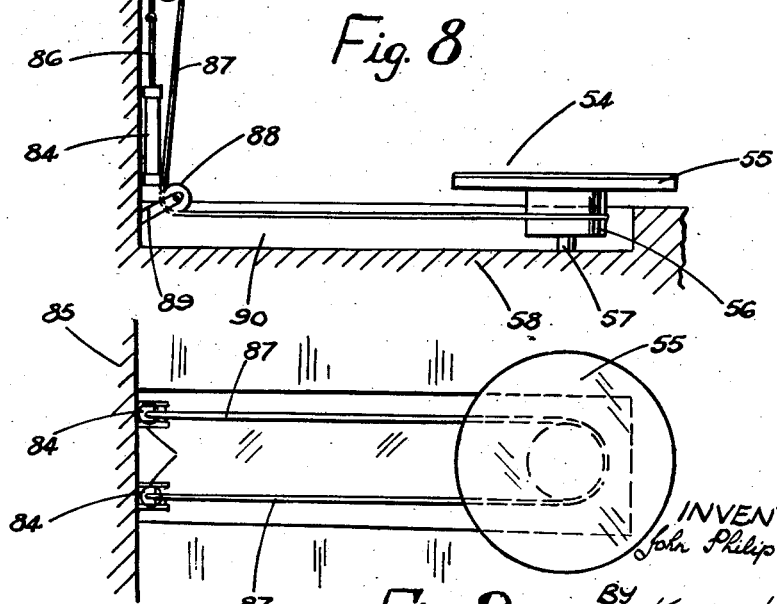

Oct. 23, 1962 J. P. LISSIMORE 3,059,786
STACKING APPARATUS
Filed Aug. 25, 1959 8 Sheets-Sheet 7

INVENTOR
John Philip Lissimore
BY Kurt Kelman
AGENT

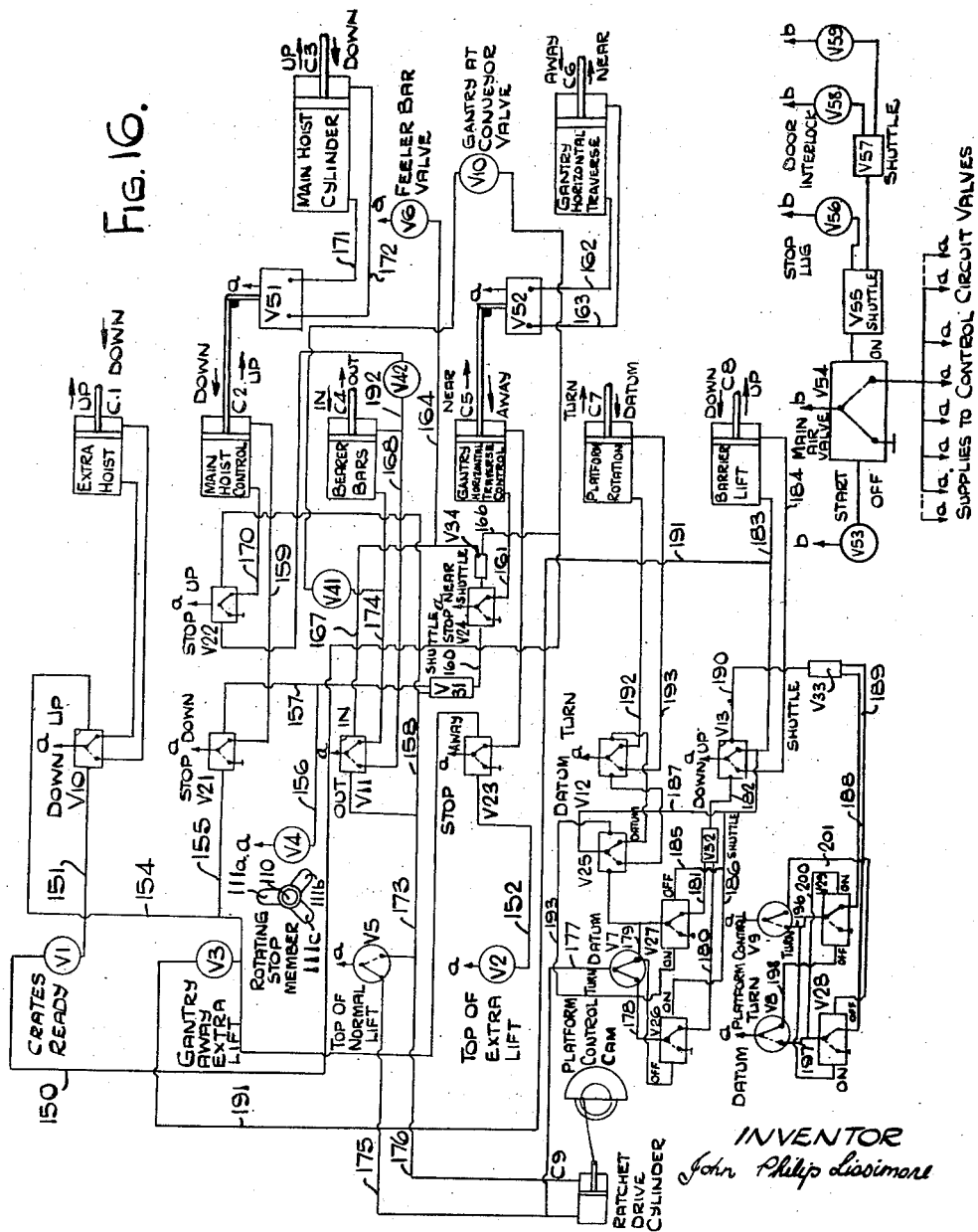

United States Patent Office 3,059,786
Patented Oct. 23, 1962

3,059,786
STACKING APPARATUS
John Philip Lissimore, 636 Burton Road,
Littleover, England
Filed Aug. 25, 1959, Ser. No. 836,026
2 Claims. (Cl. 214—6)

This invention relates to a new or improved stacking apparatus for "crates" which term is to be deemed to mean any form of box, case, or container having top and bottom faces lying in vertically spaced parallel planes and of surface area and configuration such as to permit of the stacking of a plurality of like crates in successively superposed relation.

One object of the present invention is to provide an improved construction of stacking apparatus which can be readily adapted for use with a variety of forms of incoming conveyor.

Another object of the invention is to provide a stacking apparatus suitable for use with incoming conveyors of varying heights in relation to the station at which the crates are required to be stacked.

A further object of the invention is to provide a stacking apparatus which enables a stack of crates to be built wherein the crates contained in the layers of this stack are maintained in properly compacted formation during their movement from a transfer station on an incoming conveyor to the stacking station and during deposition of these layers thereat.

Yet another object of the invention is to avoid the necessity for raising and lowering as a single load the whole of the crates contained in a given stack, the raising and lowering movement necessary to deposit each layer of crates at its proper position within the stack being performed by elevator means, which at the most are required to raise and lower crates contained in a single layer.

Further objects and advantages of the stacking apparatus in accordance with the invention will appear from the description of a preferred embodiment thereof illustrated by way of example in the accompanying drawings and wherein:

FIGURE 5 is a fragmentary view in front elevation and on an enlarged scale showing the actuating means for moving the gantry carriage in a horizontal direction.

FIGURE 6 is a plan view of this actuating means.

FIGURE 7 is a fragmentary view in side elevation, and on a reduced scale, showing the positional relationship between part of the carriage, platform member, barrier member, and conveyor and a typical stack of crates built with platform member.

FIGURE 8 is a fragmentary view in side elevation and on a reduced scale showing the actuating means for effecting angular displacement of the platform member.

FIGURE 9 is a plan view of the platform member and actuating means therefor.

FIGURE 16 is a diagram of connection of a control means comprising pneumatic valves and piston and cylinder unit for co-ordinating operation of the various actuating devices of the apparatus.

Figure 1:
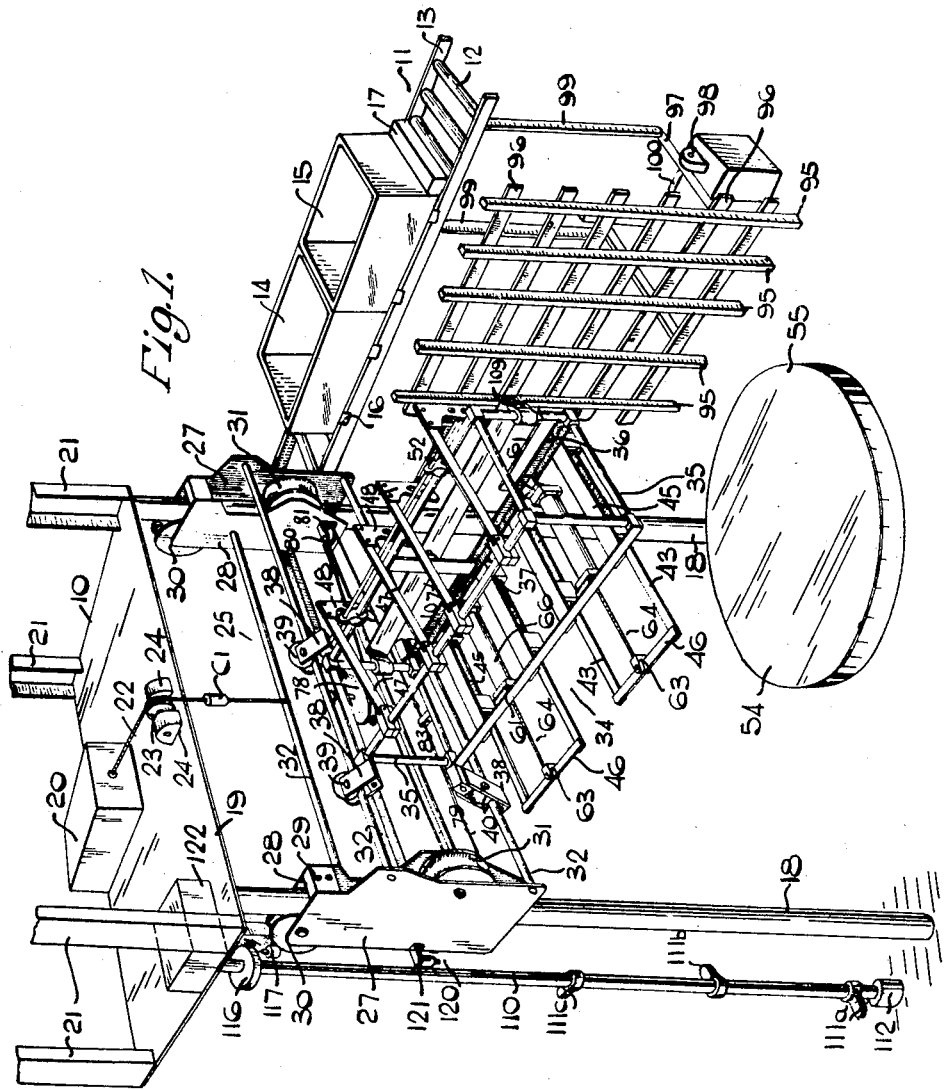
FIGURE 1 is a perspective view of one construction of stacking apparatus in accordance with the invention.

As illustrated the stacking apparatus comprises a fixed support indicated generally at 10 of any suitable construction which is disposed at one side of a conveyor 11. The conveyor 11 comprises members constituting a trackway such as rollers 12 mounted between side rails 13, which rollers support crates 14 and 15 these being shown at a station herein termed the "transfer" station.

It will be understood that the crates 14 and 15 may be delivered to the transfer station by the conveyor 11 gravitationally or by virtue of their own momentum, or the rollers 12 or certain of them may be driven in order to advance the crates to the transfer station there preferably being no such driven rollers beneath the crates 14 and 15 when they are actually disposed at the transfer station.

One of the side rails is formed in its upper edge with slots 16 so as to provide open ended passageways in the trackway of the conveyor beneath the crates 14 and 15. In some cases it may be more convenient to use a single broad slot instead of a plurality of slots.

The slots have a depth such that their lower edges lie below the level of the supporting surface afforded by the rollers 12, and the slots are positioned in registration with the spaces between the rollers so that the slots constitute open ends for the passageway previously referred to whilst the rollers on either side of each such passageway form the lateral boundaries thereof.

For the sake of example it will be assumed that the number of crates to be transferred from the conveyor is two, these being the crates 14 and 15, but it will be understood that the stacking apparatus may readily be modified to handle a single crate or more than two crates if the particular circumstances make this desirable.

For arresting the crates 14 and 15 at the transfer station the conveyor 11 is provided with a suitable means such as a stop member 17 extending transversely of the trackway.

Referring now to the support 10 this may comprise a pair of vertical posts 18, which may be connected at their lower ends by a base plate or member, or may be embedded in the floor of the premises in which the apparatus is installed.

These posts may be of tubular form or may be I-section or L-section girders whichever may be convenient in any particular case.

At their upper ends the posts are connected by a cross member 19 which serves to support power driven elevator means indicated generally at 20. The cross member 19 may be secured at its ends to upwardly extending members 21 which themselves may be embedded in or otherwise secured to the ceiling of the premises.

The elevator means 20 may comprise a piston and cylinder unit the movable component of which has secured thereto a cable 22 passing over a pulley 23 journalled between mounting blocks 24 on the cross member 19 and connected to a main carriage indicated generally at 25. The main carriage 25 forms in combination with the posts a gantry structure. The cable 22 contains a subordinate power actuated lifting device C1 for applying an extra lift to the main carriage preparatory to removal of the crates 14 and 15 from the conveyor as hereinafter described.

The main carriage 25 comprises side members each formed of spaced parallel vertical plates 27 and 28 connected and spaced apart by spacing blocks 29 so as to provide clearance with respect to the posts 18. Between each pair of plates are disposed rollers 30 and 31 journalled for rotation about the respective horizontal axes which are spaced apart vertically and also horizontally so that the rollers lie one at the rear and the other at the front of an associated post 18 as well as being one above the other.

The rollers may be of any form appropriate to the posts 18 which are employed. For example in the illustrated construction employing tubular posts of circular cross section the rollers 30 and 31 are each formed with a peripheral groove conforming approximately to the cross sectional shape of the posts, whereas in the case where I-section girders are employed for the posts 18 plain cylindrical rollers might be employed engaging in oppositely facing channels afforded by these posts.

The side members of the main carriage are connected by a bridge structure which affords a horizontal guideway. The bridge structure may comprise three horizontal cross members 32 which may be of tubular form and an L-section girder 33 at the rear of the main carriage.

Two of the cross members 32 at the front of the carriage are spaced apart vertically to constitute the horizontal guideway referred to and on these cross members is mounted a further part of the transfer member in the form of a horizontally travelling secondary or gantry carriage 34.

The gantry carriage itself may comprise a cage-like structure consisting of two end frames 35 of rectangular form having their corresponding corners connected by horizontal bars extending fore-and-aft of the transfer member, the lower pair of such bars conveniently being angle section girders 36 and the upper pair of such bars being tubular members 37.

Extensions of the upper and lower limbs of the end frame 35 at the rearward end of the gantry carriage have clamped or otherwise secured thereto pairs of trunnion plates 38 the two upper pairs of such plates inclining downwardly and rearwardly.

Rollers 39 journalled between each of the upper pairs of trunnion plates are disposed somewhat behind the associated cross member 32 so that the latter passes between the trunnion plates 38 and also between each of the rollers 39 and the end frame member 35 which carries these trunnion plates, whereas rollers 40 journalled between each of the lower pairs of trunnion plates are disposed somewhat forwardly of the associated cross member 32.

In order to guard against disengagement of the lower pair of rollers 40 from their associated cross member 32 one of the trunnion plates in each of the lower pairs has secured thereto a retainer bracket 41 from which projects a stop bolt 42 having its head disposed in relation to the cross member 32 at a position diametrically opposite the roller 40.

Slidably mounted on the gantry carriage is a bearer comprising a plurality of bearer bars 34 slidably mounted for endwise movement in guides 44 secured through the intermediary of cross strips 45 to the two lower members 36 of the gantry carriage.

The bearer bars 43 whilst being of a material such as steel and of cross section dimensions sufficient to bear the load of crates required to be supported are of sufficiently small cross sectional dimension to enter through the slots 16 of the conveyor.

Figure 3:
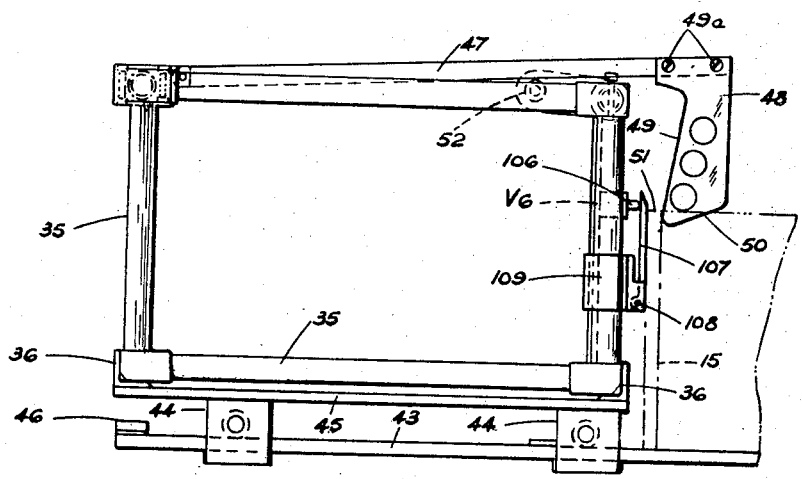
FIGURE 3 is a fragmentary view in front elevation of part of the transfer member illustrating the manner of supporting and retaining crates on the bearer thereof, the crates being of "small" height.
Figure 4:
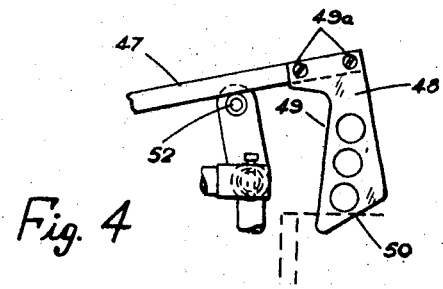
FIGURE 4 is a fragmentary view showing the retaining member of the gantry carriage on its operative position for a crate of "full" height.

The bearer bars 43 are connected in pairs by cross bars 46 at their ends remote from the conveyor 11 and which as hereinafter described form a convenient means for connecting the bearer bars to actuating means for projecting them endwise towards the conveyor, as seen in FIGURE 3, and for withdrawing them as seen in FIGURE 1.

In order to ensure that the crates 14 and 15 will be withdrawn bodily from the conveyor 11 with the gantry carriage when the latter is moved away from the conveyor after the bearer bars 43 have been introduced beneath the crates the gantry carriage is further provided with a retaining member which may comprise a plurality of arm elements 47 pivotally supported about a common horizontal axis conveniently constituted by the upper gantry carriage frame member 37 remote from the conveyor.

The arm elements 47 are freely movable about this pivotal axis either individually as illustrated, or if desired, collectively in which case they would be connected by a member extending fore-and-aft of the transfer member that is to say at right angles to the arm element.

At their free ends the arm elements are provided with abutment elements 48 in the form of plates which may be secured as by screws 49a to the arm elements.

The plates 48 present a shoulder 49 facing towards the gantry carriage such shoulder being vertical or inclined thereto at a slight angle as seen in FIGURE 3 in which case the inclination is preferably upwardly from the lower end of the shoulder and away from the gantry carriage. The lower edges of the plates 48 are inclined to provide a cam or ratchet face 50 which inclines upwardly in a direction away from the gantry carriage whereby these cam faces can engage with the edges 51 of crates to cause the plates to ride over these edges and engage behind the lip or margin at the upper extremity of the sides of the crates nearest the gantry carriage as seen particularly in FIGURE 3, this action occurring as the gantry carriage is moved towards the crates whilst these are situated on the conveyor 11.

The angular positions occupied by the arm elements 47 about the axis afforded by the gantry carriage frame member 37 remote from the conveyor may be adjusted in accordance with the height of the crates to be handled. For crates of full height the arm elements 47 may be raised by means of a lifter bar 52 carried by rockers pivotally mounted on the other of the two gantry carriage frame members 37, whereas for crates of small height as seen in FIGURE 3 the lifter bar and rockers may be lowered.

The construction of retaining member described and illustrated is appropriate for crates which are open at their upper sides such as crates which are used for containing bottles, cans, or other subsidiary containers. The arrangement illustrated, with some modification of the shoulder afforded by each of the plates 48, would also be appropriate where crates which are closed at their upper sides are provided externally on these upper sides with ribs or strips extending lengthwise of the conveyor so as to present an abutment face directed away from the gantry carriage and which can be engaged by the shoulders 49 of the plates 48.

In cases where the crates are closed at their upper sides and these upper sides do not in themselves present any such abutment as above described, the arm elements 47 may be longer than those illustrated so as to project beyond the sides of the crates remote from the gantry carriage thus permitting the plates 47 to descend beyond these sides of the crates and operate in relation to the crates in a manner similar to that illustrated. If desired, the arm elements 47 may be made adjustable for length as for example by making each of them in two parts which are assembled in overlapping relation, the degree of overlap being capable of being adjusted.

Alternatively, instead of employing arm elements 47 which are free to rise and fall, they could be controlled by cam or other mechanism operatively connected with actuating means for the transfer member so as to be lowered behind the crate abutment face at the transfer station.

The stacking apparatus further comprises a platform member in the form of a rotary turntable 54 intended to support a pallet upon which the crates are to be stacked, the space above this turntable thus constituting a stacking station. As seen in plan the turntable 54 may occupy a position in between the conveyor 11 and the gantry carriage 34 when the latter is withdrawn from the conveyor to its maximum extent, so that it is then merely necessary to lower the main carriage forming part of the transfer member to bring the crates to the required level in relation to the turntable.

The turntable 54 may comprise a crate receiving and supporting portion in the form of a disc 55 (FIGURE 8) which may either be formed as a plate or as a fabricated structure, and a bearing housing 56 in which is disposed a bearing (not illustrated), by means of which the turntable can be mounted on an upstanding spindle 57 embedded in or otherwise suitably fixed to the floor 58 of the premises in which the apparatus is installed.

The disc is typically of a sufficiently large diameter to accommodate four crates such as 14 and 15 in each layer, although it will be understood that the dimensions may be varied to suit differing applications.

The apparatus further includes actuating means comprising power energised actuating devices associated operatively with the various moving parts of the apparatus for moving these in the required timed relation.

One of the actuating devices, comprising the elevator means 20 and cable 22, may, if desired, be provided with a counter-balance weight selected so as to have a weight lying between the dead weight of the gantry carriage and main carriage in the unloaded state and the aggregate weight of these components and a typical load of crates thereon. By adopting this arrangement the elevator means 20 whether in the form of a pneumatic piston and cylinder unit or whether in some other form such as an electric motor, merely operates to control the rate of downward and upward movement of the carriage and gantry carried thereby which tends always to take place gravitationally. Preferably the value of the counterweight is as nearly as possible mid-way between the two dead weight values afforded by the gantry carriage and main carriage assembly in the loaded and un-loaded condition.

For actuating the bearer bars 43 the power energised driving device may comprise a pair of pneumatic piston and cylinder units C6 of the double acting type, these being secured to the lower members 36 of the gantry carriage frame by suitable brackets 61.

Each such unit C6 may be connected to a respective pair of bearer bars 43 through the bars 46 which are welded or otherwise suitably fixed to the ends of the bearer bars 43 and are pivotally connected at 62 to forked brackets 63 at the ends of the piston rods 64 of the units.

Figure 2:
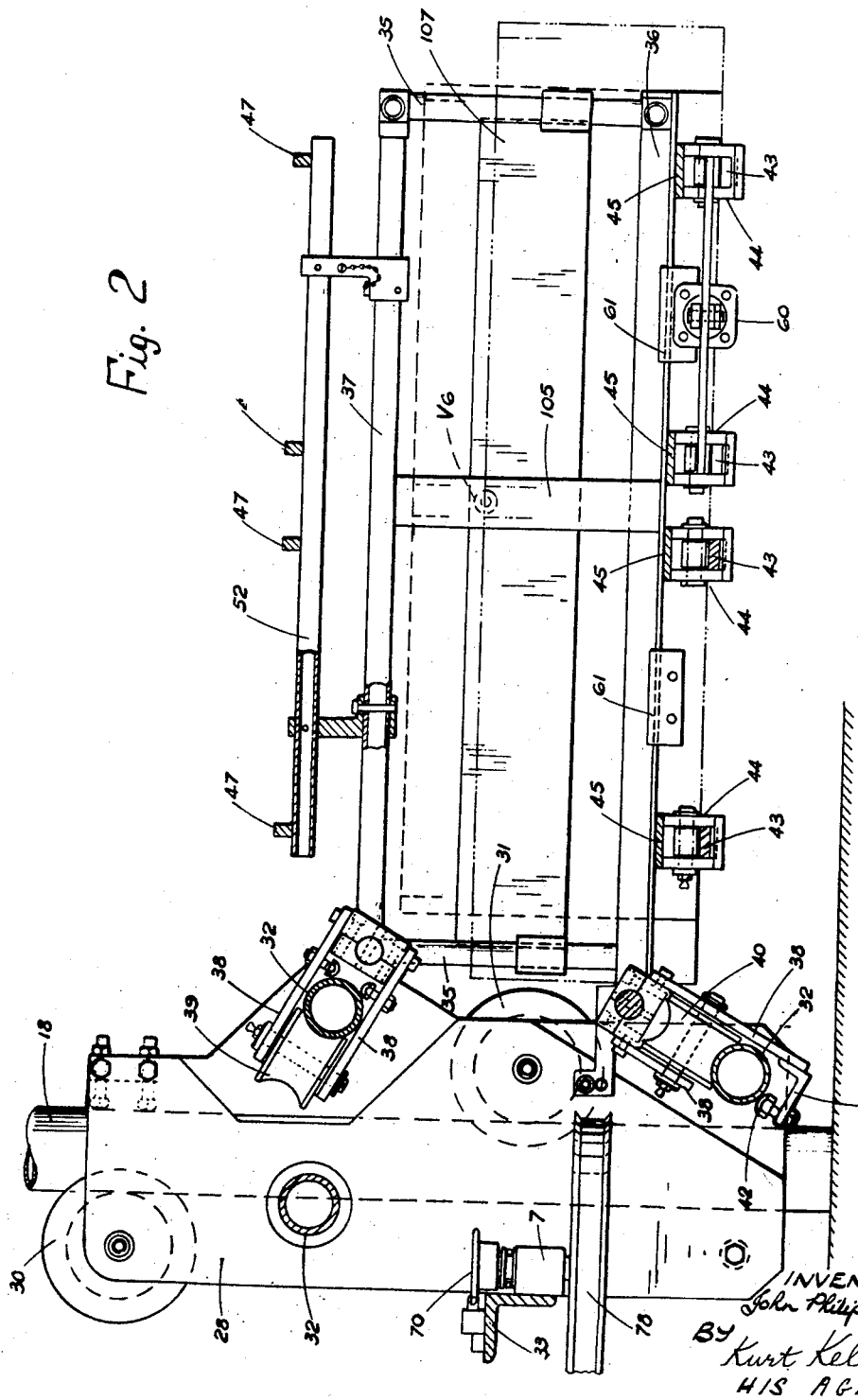
FIGURE 2 is a fragmentary view of the apparatus in side elevation and partly in cross section on an enlarged scale showing component parts of the transfer member and the mounting thereof on its associated support.

As seen particularly in FIGURES 2 and 3 it will be observed that the blocks 46 in which the bearer bars are mounted are provided with rollers 65 to reduce the frictional load involved in moving the bearer bars, and although not illustrated it will be understood that such rollers may be provided beneath each bearer bar as well as above it if desired, or above each bearer bar at its ends remote from the conveyor and below each bearer bar at its end nearest the conveyor if desired.

For actuating the gantry carriage that is to say moving it towards and away from the conveyor, the power energised driving device provided may also be in the form of a piston and cylinder unit C5 (FIGURES 5 and 6) of the double acting type. In the arrangement illustrated magnification of the stroke of this piston and cylinder unit is attained by pivotally connecting the piston rod 67 thereof as indicated at 68 to a rack member 71 mounted for endwise reciprocation between a guide 69 and a pinion 70.

The rack member 71 may comprise a bar 72 which at opposite ends is provided with anchor lugs 73 between which is stretched a length of sprocket chain 74 constituting the toothed element of the rack and meshing with the pinion 70 which is in the form of a sprocket wheel. One of the anchor lugs 73 may have a tapped hole extending through it in which engages the screw threaded shank of a chain tensioning member 75.

This assembly may be mounted on the cross member 33 of the main carriage which has secured thereto a bearing block 7 for the reception of a spindle 76 to the upper end of which the sprocket 70 is fixed. Between the underside of the sprocket 70 and the bearing block is disposed on the spindle 76 a thrust bearing 77 of the ball or roller type.

To the lower end of the spindle 76 is fixed a pulley 78 of larger diameter than the sprocket 70, a typical ratio of diameters being 4 to 1.

A cable 79 which is lapped by one or more complete turns around the periphery of the pulley 78 passes over pulleys 80 mounted on brackets 81 secured to the inner side plates 28 of the main carriage, the ends of this cable being connected respectively to opposite ends of a double-ended eye-bolt 82 the shank of which engages through a tapped hole in a lug 83 projecting rearwardly from the adjacent end-frame of the gantry carriage.

The arrangement above described provides a stroke magnification equal to the ratio of diameters of the sprocket and pulley, typically such magnification being 4 to 1.

For actuating the turntable 54 the power energised driving device provided may comprise a pair of pneumatic piston and cylinder units 84 (FIGURE 8) which may be mounted on any suitable fixed structure, such, for example as the wall 85 of the premises in which the apparatus is installed, or possibly on some suitable part of the fixed support on which the transfer member is mounted in any case where it is desired so far as possible to make the apparatus self-contained. The piston rods 86 of the units 84 are connected respectively to the free ends of a cable 87 which after passing around guide pulleys 88 mounted on brackets 89 secured to the wall 85 pass along a channel 90 in the floor of the premises and around the outer surface of the bearing housing 56 of the turntable 54. The cable 87 may be positively secured at one or more positions to the bearing housing 56 so that there is no possibility of slip between the turntable 54 and the cable.

The diameter of the bearing housing 56 is selected in relation to the length of the stroke of the units 84 to provide rotation of the turntable through an angle of 90° or approximately so for a complete stroke of the units.

It will be understood that the unit 84 may, as illustrated, be of the single acting type, one being operative to rotate the turntable in a clockwise direction as seen in plan and the other in an anti-clockwise direction or alternatively one double acting unit may be employed, as shown in FIGURE 16 at C7 in which case the cable 87 may be endless and attached to the movable component of the double acting piston and cylinder unit.

In association with the turntable 54 and gantry 34 is provided a barrier member 91 (FIGURE 7). The purpose of the barrier member is to provide a fence or stop face against which a crate or group of crates conveyed to the stacking station by the gantry carriage can be engaged and thus located in accurate vertical registration with the edge of a pallet 92 remote from the gantry carriage which pallet is placed on the turntable 54.

It will be observed from FIGURE 7 that each layer of the stack contains a plurality of crates, typically there being six crates in each layer these crates being disposed in three rows indicated at 93a, 93b and 93c, each consisting of two crates arranged end to end that is to say in the manner in which the crates are delivered by the conveyor against the stop member 17 thereon.

After a complete layer of crates has been delivered on to the pallet, the turntable is caused to undergo an angular displacement at 90° so that it will be apparent that the two crates of a particular row are visible in FIGURE 7 in alternate layers as indicated at 94a and 94b for the lowest layer.

In delivering the crates of a layer to the turntable the crates contained in a row such as 93a nearest the barrier member are delivered first and then the abutment face presented by these crates towards the gantry carriage constitutes the barrier operative in respect of the next delivery constituting of the crates in row 93b.

Advantageously the barrier member 91 is disposed in vertical alignment or approximately so with the lateral boundary of the conveyor 11 nearest the gantry carriage but it will be understood that this is not essential, it merely minimises the time taken to execute horizontal traverse in removing the crates from the conveyor.

To permit of angular displacement of the turntable 54 the barrier member 91, which may comprise an assembly of vertical bars 95 and horizontal slots 96 is mounted so that it can be withdrawn laterally away from the stack of crates and may, for this purpose, be supported by upper and lower links 97 pivotally supported intermediate their ends on brackets 98 and connected at their ends remote from the barrier member by a vertical link 99.

The lower links 97 may be fixed on a shaft 100 to which also is fixed a rocker arm 101 having a pin and slot connection with the piston rod 102 of a pneumatic piston and cylinder unit 108 it being evident that when this unit is energised to depress the piston rod and rocker arm the barrier member 91 will be raised along the arcuate path withdrawing it laterally from the stack of crates.

Limitation of horizontal traverse of the gantry carriage in delivering a load of crates into a row 93a, 93b or 93c is effected by the provision on the gantry carriage of a control valve V6 (FIGURES 2 and 3) conveniently mounted on an upright 105 extending between the members 36 and 37 of the gantry carriage at one side, this valve having an operating member 106 adapted to be depressed by a feeler bar 107 when lateral pressure is applied to the outer face of the feeler bar towards the gantry carriage by the crates carried thereby.

The feeler bar may comprise a plate extending for the whole length of the gantry carriage and pivotally mounted at 108 at its lower end to suitable brackets 109 provided on the end frames 35 and the end of the gantry carriage, stop means being provided to limit pivotal movement of the feeler bar away from the gantry carriage in the absence of crates on the bearer bar 43 thereof.

The feeler bar also serves as a stop means in that its laterally presented abutment face engages with the opposed lateral faces of the crates carried on the bearer bars during retraction of the latter, thereby enabling the crates to remain in their proper positions for stacking during such retraction.

In association with the gantry carriage and main carriage is provided a height control means adapted to arrest the carriage firstly at a level which enables it to deposit a row of crates on the pallet 92 and after a complete layer of crates has been deposited thereon, operates to arrest the main carriage at successively higher levels to enable one or more further layers of crates to be deposited on the first, second and higher layers so as to build a stack of which that shown in FIGURE 7 is typical.

Figures 13, 14, 15:
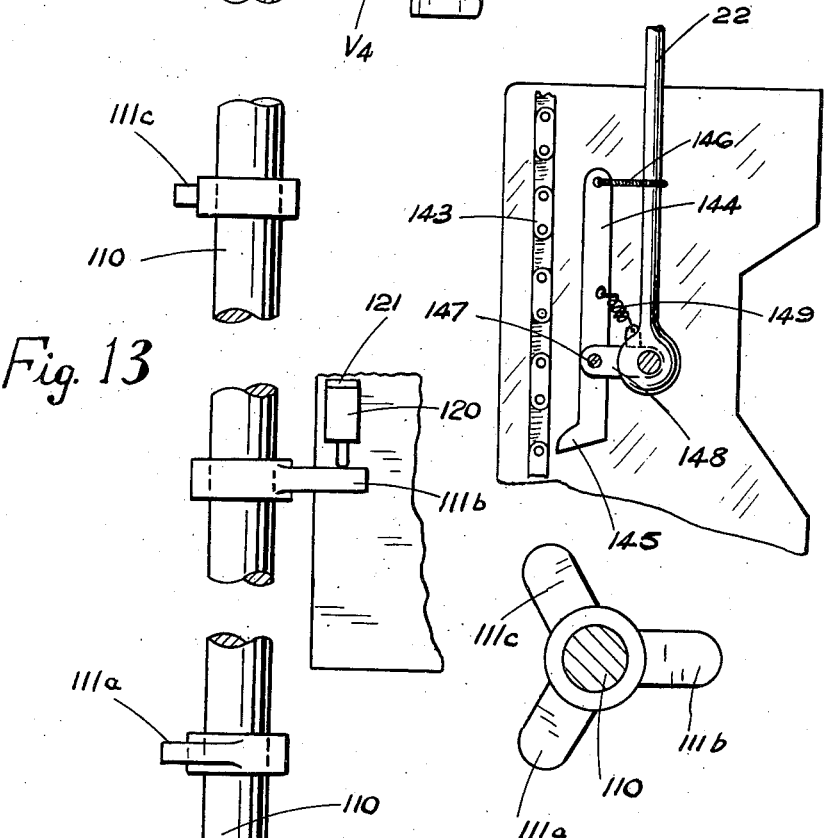
FIGURE 13 is a view in front elevation of a stop member provided in association with the support and a co-operative stop element on the main carriage on which the gantry carriage is mounted.
FIGURE 14 is a plan view of the stop member.
FIGURE 15 is a fragmentary view illustrating a safety device for arresting the main carriage and gantry carriage carried thereby against vertical descent in the event of failure of the elevator means.

The height control means are illustrated more particularly in FIGURES 13 and 14 wherein it will be seen that one component of the height control means is constituted by stop member comprising a vertical stop shaft 110. The shaft 110 has fixed thereto radially projecting stop elements in the form of lugs 111a, 111b and 111c, three such lugs only being shown for simplicity. It will be understood that this arrangement would be appropriate to the building of a stack consisting of three layers, the lugs projecting radially at positions spaced apart by 120°, but for a greater number of lugs the angular spacing would be reduced correspondingly.

The lugs 111a to c may be adjustably mounted on the shaft 110 and secured in position in any suitable manner as for example by set screws.

The shaft 110 is supported at its lower end in a socket bearing of which the outer case is seen at 112 (FIGURE 1) so as to be rotatable and also to some extent axially movable under the influence of a coiled compression spring 113 operating between a flange plate 114 forming part of the socket bearing and a collar 115 fixed on the shaft.

At its upper end the shaft is journalled in any suitable bearing carried on the cross member 19 and adjacent to the cross member but somewhat below it has secured thereto an operating collar 116 which engages with the operating plunger 117 of a control valve V4 conveniently secured to a block 119 projecting from the inside of the cross member 19.

Mechanism hereinafter described is arranged to index the shaft 110 angularly through displacement of 120° upon completion of each layer of the stack and the stop lugs 111a to c are successively brought into the path of co-operative stop member in the form of a fixed lug 120 mounted on a bracket 121 on the main carriage.

It will be evident that whenever the lug 120 engages a lug 111a to c the shaft 110 is displaced axially downwards and the operating collar 110 depresses the plunger 117 and operates the control valve V4.

Figure 10:
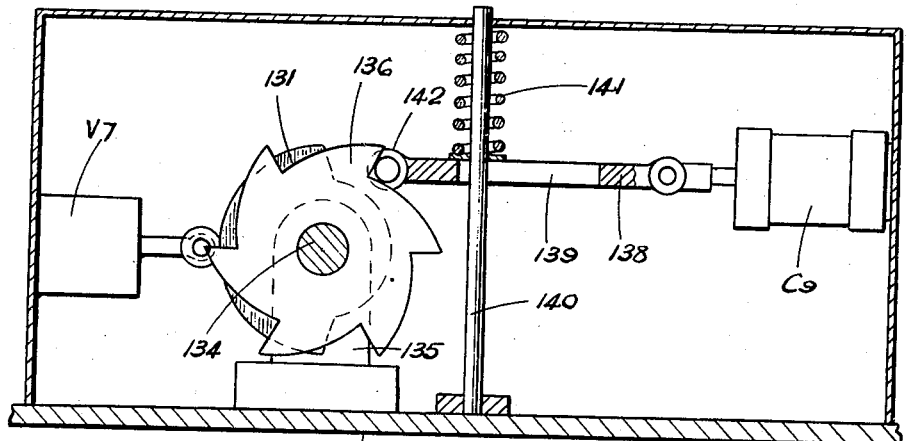
FIGURE 10 is a view partly in cross section of an indexing unit controlling operation of the actuating means for effecting angular displacement of the platform member and also a stop member forming part of the height control means.
Figure 11:
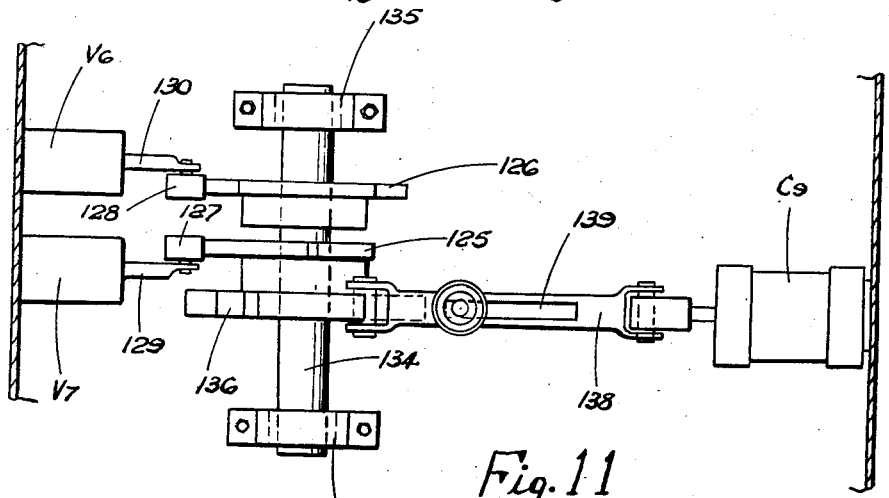
FIGURE 11 is a fragmentary plan view of the indexing unit.
Figure 12:
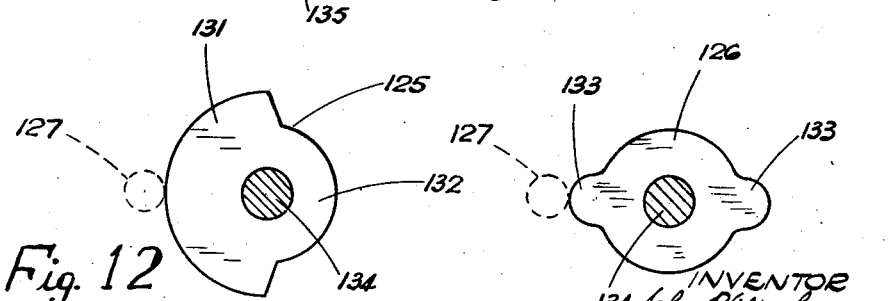
FIGURE 12 is fragmentary views illustrating cams embodied in the unit for operating control valves associated with the platform actuating means and with the stop member actuating means.

Mechanism for indexing the shaft 110 and also for periodically operating the control valve associated with the pneumatic units 84 for indexing the turntable may be contained in the housing 122 mounted on the cross member 19 at the upper end of the shaft 110, such mechanism being illustrated more particularly in FIGURES 10 to 12.

The control valve associated with the units 84 is shown at V7 (FIGURE 10) whilst that for controlling an actuating unit for the shaft 110 (not illustrated) is shown at V6 (FIGURE 11).

These two valves are operated respectively by cams 126 and 125 which engage with roller type followers 128 and 127 and valve operating members 130 and 129.

The cam 125 includes a high segment 131 and a low segment 132 whilst the cam 126 includes two high portions 133 at diametrically opposed positions. The cams are fixed, preferably adjustably, on cam spindle 134 supported in suitable bearings 135. This spindle having also fixed thereto a ratchet wheel 136.

The ratchet wheel is shown as having six teeth, this being appropriate to the number of rows of crates contained in each layer to be built, but it will be understood that the ratchet wheel may be changed for one having a different number of teeth according to the number of rows of crates in each layer or alternatively adjustable or removable teeth may be employed. Any suitable means may be provided for rotating the spindle 134 through half a revolution in response to a pre-determined number of operations of an actuating device such as the pneumatic piston and cylinder unit C9. The piston rod of this unit is connected to a driving bar 138, which is slotted as seen at 139 and through which extends a post 140 on which is disposed a coiled compression spring 141 urging the bar into contact at its free end with the ratchet wheel. At this end the bar may have a roller 142 mounted thereon.

A holding ratchet and pawl, or a friction device, may be provided in association with the spindle 134 to prevent reverse rotation thereof during the retraction stroke of the driving bar 138.

Upon operation of the control valve V6, which will occur twice for every complete revolution of the spindle 134, an actuating device such as the pneumatic piston and cylinder unit is caused to rotate the shaft 110 through an appropriate angle (e.g. 120°) in any manner, for example through the intermediary of pawl and ratchet mechanism which may be adapted to permit of the magnitude of the angular step being varied as required.

It will be understood that instead of rotating the shaft 110 automatically some suitable manually operable member may be provided to enable the operator to rotate this shaft manually upon completion of each layer of the stack.

To guard against the possibility of descent of the main carriage and gantry carriage should the cable 22 break there may be associated therewith an arresting device such as that illustrated in FIGURE 15.

This device comprises a fixed member affording a plurality of longitudinally spaced abutments conveniently constituted by a length of sprocket chain 143 suitably secured at its upper and lower ends for example to the cross member 19 and to an anchorage in the floor. It will be understood that the device has been omitted from FIGURE 1 and other figures of the drawings for clarity.

In association with the chain 143 is provided a movable pawl 144 having a nose 145 normally retained out of engagement with the chain 143 by means of a link 146 which acts strut-wise between the upper end of the pawl and cable 22.

The pawl is pivoted on a pin 147 extending between lugs 148 projecting from any suitable part of the main carriage such as the cross member 32 and is spring loaded by a coiled tension spring 149.

Should the cable 22 break the pawl is pivoted by the spring 149 to engage the nose 145 in one of the apertures afforded by the chain 143, the spring 149 being sufficiently strong to overcome any resistance to such movement imposed by the stiffness of the cable 22.

The apparatus illustrated in FIGURE 1 with the exception of the conveyor 11 may be enclosed in a cage or other suitable guard structure having a door which can be opened and closed to permit of obtaining access to the turntable 54, this door having associated with it interlock means as hereinafter described preventing operation of the stacking apparatus until the door is closed.

Referring now to the control means illustrated in FIGURE 16 for enabling the apparatus to perform its function automatically, the nature and manner of operation of these control means will be best understood by a description of the sequence of operations taking place therein which is as follows. To facilitate understanding of the operation of the control means the positions in which each of the control valves may be set have been indicated on the drawing by terminology appropriate to the valve setting in each case, and similar terminology, appropriate to the operation performed or controlled by the piston, has been applied on the drawing against each of the piston and cylinder units indicating the direction of piston movement.

Starting with the gantry carriage 34 in its normal upper position with the bearer bars 43 projected and entering into the slot 16 beneath the crates 14 and 15 the sequence of operations is initiated by valve V1 which incorporates a mechanically displaceable operating member engageable by the crates 14 and 15 upon arrival at the transfer station. Such valve may, for example, be mounted on the stop member 17. A pressure pulse from a suitable source of air under pressure applied to the pipes at positions indicated at b is conveyed in a manner hereinafter described along pipe 150 through the valve V1 and thence along 151 to valve V10 causing this to throw the valve from the "down" to the "up" position and energise the extra hoist cylinder C1 to raise the main carriage and hence the crates 14 and 15 clear of the conveyor.

At the top of this extra lift movement produced by the cylinder C1 the mechanically displaceable operating member of valve V2 is operated causing a pulse of pressure to be conveyed from a supply point a along pipe 152 to throw valve V23 forming part of the horizontal traverse control for the gantry carriage from the "stop" to the "away" position, and thence conveying a pressure supply from the supply point a on this valve through pipe 155 to the cylinder C5. The piston rod of C5 is connected mechanically to the operating member of valve V52 and when the piston is moved to the "near" position the valve V52 is placed in a position to establish a supply from supply point a thereon to the gantry carriage horizontal traverse cylinder C6 causing the gantry carriage to be withdrawn laterally from the conveyor.

When the gantry carriage is completely withdrawn the mechanically displaceable operating member of valve V3 is operated (subject to the barrier member being in the operative position) and valve V10 is returned to its initial "down" position by a pulse through pipe 154, and valve V21 is thrown to its "down" position by a pulse along pipe 155, the former returning the extra hoist cylinder to its "down" position and the latter establishing a supply from supply point a on valve V21 to the main hoist control cylinder C2.

The piston of the cylinder C2 is then moved to its "down" position operating the mechanically displaceable operating member of valve V51 and establishing a supply from supply point a on this valve to the main hoist cylinder C3 in a manner permitting the main carriage to descend.

The valve V51 is of a type effective to prevent leakage from the cylinder C3 when closed against either "up" movement or "down" movement and therefore enables the main carriage to be stopped at any desired level. The valve V52 is of a similar type and operates similarly in relation to its cylinder C6. The valve V52 is spring returned to its "centre" or "stop" position.

When the gantry carriage is at an appropriate level for example with the bearer bars 43 disposed at about 1" above the pallet the stop 120 on the main carriage engages the lowest stop lug 111a on the shaft 110 and valve V4 is operated by the collar 116. This returns valve V21 to its "stop" position by applying a pulse from supply point a on valve V4 through pipes 156 and 157, valve V21 thereby displacing the piston of the cylinder C2 to the "stop" position intermediate the ends of this cylinder and arresting descent of the main carriage.

Simultaneously the pulse supplied to pipe 157 passes through shuttle valve V31 isolating pipe 158 therefrom and through pipe 160 throws valve V24 from the "stop" position to the "near" position. A supply from supply point a on valve V24 is thus established through pipe 161 to the gantry carriage horizontal traverse control cylinder C5 displacing this from its "mid" or "stop" position to its "near" position, and operating the mechanically displaceable operating member of valve V52 to energise the horizontal traverse cylinder C6 of the gantry carriage in a direction which will advance this towards the pallet, i.e. the "near position."

When the crates 14 and 15 engage the barrier member the feeler bar of the gantry carriage operates valve V6 and a pressure pulse from the supply point a thereon is conveyed by a pipe 164 and pipe 165 to shuttle valve V34, isolating pipe 166, and transmitting a pulse to valve V24 to restore this to the "stop" position and thus to restore the piston of cylinder C5 to its "mid" or "stop" position and arrest operation of cylinder C6.

The feeler bar is preferably spring loaded and should have a travel of not less than about 1" to work a microtype valve V6 disposed behind the feeler bar.

Simultaneously the pressure pulse on line 164 is conveyed via pipe 167 to valve V11 throwing this from the "in" to the "out" position and establishing a supply from supply point *a* thereon via pipe 168 to cylinder C4 for withdrawing the bearer bars.

Upon withdrawal of the bearer bars the crates are dropped.

When the bearer bars have been completely retracted pressure in pipe 192 can build up to supply valve and open unloader valve V42 so that a supply is established through this valve from pipe 168 and pipe 169 to valve V22 throwing this to the "up" position. A supply is thus established from the supply point *a* on valve V22 through pipe 170 to the main hoist control cylinder C2 displacing this from its "mid" or "stop" position to its "up" position, and establishing a supply from the supply point *a* on valve V51 through the appropriate pipe 171 to energise the cylinder C3 and raise the main carriage.

When the main carriage arrives at the top of its normal travel the mechanically displaceable operating member of valve V5 is operated establishing a supply from supply point *a* thereon through pipes 173 and 158 restoring valve V22 to its "stop" position and through C2 and C3 bringing the main carriage to rest.

At the same time valve V11 is supplied with a pulse which restores it to the "in" position establishing a supply from the supply point *a* thereon through pipe 174 to cylinder C4 causing the bearer bars to be projected.

Simultaneously a pulse proceeds via shuttle valve V31, thus moved into a position, thus isolating pipe 157, to pipe 160 restoring valve V24 to the "near" position and energising cylinder C5 and through the intermediary of cylinder C5, valve V52, and cylinder C6 causing the gantry carriage to be traversed to the "near" position adjacent to the conveyor.

The operation of valve V5 also reverses the pressure and exhaust conditions obtaining in pipes 175 and 176 thereby displacing the piston of cylinder C9 from one end to the other end causing the driving bar 139 of the mechanism shown in FIGURE 10 to advance the ratchet wheel 136 by one tooth.

This completes the sequence of operations involved in transferring a group of crates such as 14 and 15 from the transfer station to the stacking station, the sequence being repeated as soon as a fresh pair of crates has arrived in position and differing only in that the newly arriving pair of crates when transferred to the stacking station will abut the crates already disposed there instead of abutting the barrier member. When three such cycles of operation have been completed cam 126 operates its associated valve V7 and produces an incremental rotation of the shaft 110 in order to bring the next stop lug 111*b* into the path of the stop element 126 so that the next layer of crates is built upon the first layer.

Angular displacement of the turntable is performed automatically at this stage as follows.

When in the specific example described three complete journeys have been executed between the transfer and stacking stations the valve V7 associated with cam 125 is changed mechanically from its "datum" position (the position in which the communication through the valve is represented by the broken line) to its "turn" position (the position indicated by the full line within the valve). Subject to the valve V5 being open which will occur when the transfer member is at the top of its normal lift a pulse conveyed along pipe 193 to V25 throws this from the "datum" to the "turn" position, but since there is as yet no air supply established along pipe 187 to V25 no action results therefrom.

Secondly an air supply is transmitted from V7 through pipe 178 to valve V26 which on completion of the preceding cycle of operation will have been left in the "on" position. Thus a pulse is transmitted along pipe 180 via shuttle valve V32, isolating pipe 181 therefrom, and conveying the pulse via pipe 182 to valve V13 which is consequently thrown to the "up" position.

An air supply is thus established from the supply point *a* on valve V13 through pipe 183 to the barrier lift cylinder C8 causing this to be moved in the "up" direction and raise the barrier so that this is withdrawn clear of the existing part stack of crates on the pallet.

As soon as a supply is established in pipe 183 this supply is communicated via pipe 187 to valve V25 which had previously been thrown to the "turn" position, and consequently the supply proceeds via pipe 193 to V12 throwing this to the "turn" position and establishing a supply from the supply point *a* thereon through pipe 192 to cylinder C7 effecting rotation of the platform. The cylinder is shown as a double-acting cylinder alternatively energised at either end to cause rotation of the turntable in one direction or the other respectively through 90°. It will be understood that the pipes 192 and 193 may be connected to the individual single-acting units 84.

The turntable now rotates from its "datum" to its "turn" position, and in leaving the "datum" position operates the mechanically displaceable operating member of valve V8 throwing valve V8 from the "datum" to the "turn" position. Air supply from the supply point *a* on valve V8 via pipe 197 to valve V28 is removed therefrom, and valve V29 is thrown to the "on" position by a pulse along pipe 198 but at this time V29 does not receive any supply from valve V9 which is still in the "datum" position.

When the turntable reaches the "turn" position the mechanically displaceable operating member of valve V9 is operated throwing this valve to the "turn" position and establishing a supply from the supply point *a* thereon through pipe 196 to valve V29. The supply is communicated along pipe 188 to shuttle valve V33, isolating pipe 199, and is transmitted via pipe 190 to valve V13, throwing this to the "down" position thus causing the barrier lift cylinder to be energised in a direction resulting in movement of the piston in the "down" direction thereby lowering the barrier.

Supply is also removed from pipe 187 feeding valve V25. This completes one cycle of operations involving movement of the platform or turntable from the "datum" to the "turn" position.

In the complementary cycle of operations involving return movement from the "turn" to the "datum" position the control cam 125 throws valve V7 back to the "datum" position transferring supply to valve V27 and also throwing valve V25 to the "datum" position. The subsequent throwing of valve V13 to the "up" position by supply communicated along pipes 181 and 182 and shuttle valve V32 results in the barrier being lifted and a supply being established on pipe 183 which is communicated via pipe 187 to valve V25 thus enabling the cylinder C7 to be energised to move in the "datum" direction.

The successive reversion of valves V9 and V8 to the "datum" position remove supply from V29 and throws valve V28 to the "off" position, so that supply subsequently transmitted to valve V28 from valve V8 when this is thrown to the "datum" position upon arrival of the turntable in such position, permits a pulse to pass along pipe 199 via stop valve V33 throwing valve V13 to the "down" position so that the barrier is lowered and valve V25 is cut off from supply.

The supply of air through pipe 191 previously interrupted when the valve V13 was in the "up" position is now restored and the sequence of transfer operations from the transfer to the stacking station can continue, subject to operation of V10 and unloader valve V41 at the "out" position of cylinder C4 by disposition of the gantry carriage at the conveyor and establishment of supply in pipe 150.

It will be evident that it is necessary for air supply to be established in the pipe 191 before operation of either the extra hoist or main hoist can take place, and that it is therefore impossible that turntable and hoist operation can take place concurrently.

Each of the supply points *a* is supplied by air controlled by a main valve V54 the supply point *b* of which is connected to the main air supply.

This valve can be thrown to the "on" position by manual operation of a start valve V53 also connected to the supply *a* and the main valve reverts automatically to its "off" position in the event of the door interlock valve V58 being open in consequence of the door of the cage or guard being unclosed or in consequence of the operation of the mechanically displaceable operating member of valve V56.

The last mentioned is arranged to be operated by movement of the higher stop lock 111c back to its initial position this consequently taking place upon completion of a full stack of crates.

What I claim then is:

1. A stacking apparatus for crates, comprising a support including laterally spaced vertical guide members, a transfer member including a main carriage comprising a beam structure extending horizontally between said vertical guide members and movable therealong, said beam structure incorporating horizontal guide means, a secondary carriage including bearer means affording an upwardly presented generally horizontal crate supporting face and projecting cantileverwise from said secondary carriage, said secondary carriage being mounted on said horizontal guide means and movable therealong between a transfer station and a stacking station spaced laterally therefrom, conveyor means extending to said transfer station and including thereat a section affording a crate supporting face having an entry path disposed beneath said crate supporting face for said bearer means, a retainer member on said secondary carriage having a crate engaging face presented oppositely to that direction in which said bearer projects from said secondary carriage to engage with an abutment face on a crate-load and retain same on said bearer during removal from said transfer station, a platform member at said stacking station to receive successive crate-loads from said bearer means in superposed stacked relation, power energised means for moving said main carriage along said vertical guide members, control means for selectively arresting said main carriage at any of a plurality of heights above said platform member, power energised means for moving said secondary carriage along said horizontal guide means between said transfer and stacking stations, and means for positionally controlling a crate-load in a generally horizontal direction at said stacking station, comprising an upwardly extending barrier means disposed at one side of said stacking station to be engaged by one side of said crate-load on arrival, and stop means at the opposite side of said stacking station to be engaged by the opposite side of said crate-load upon withdrawal of said bearer means from said crate-load.

2. A stacking apparatus for crates, comprising a support including laterally spaced vertical guide members, a transfer member including a main carriage comprising a beam structure extending horizontally between said vertical guide members and movable therealong, said beam structure incorporating horizontal guide means, a secondary carriage including bearer means affording an upwardly presented generally horizontal crate supporting face and projecting cantileverwise from said secondary carriage, said secondary carriage being mounted on said horizontal guide means and movable therealong between a transfer station and a stacking station spaced laterally therefrom, conveyor means extending to said transfer station and including thereat a section affording a crate supporting face having an entry path disposed beneath said crate supporting face, for said bearer means, a retainer member comprising at least one arm element pivoted about a horizontal axis and overlying said bearer means, a crate engaging element on said arm element projecting downwardly therefrom to engage with a face of a crate-load presented in that direction in which said bearer means projects from said secondary carriage, means for raising and lowering said arm elements to disengage and engage said retaining element from and with said crate load and retain same on said bearer during removal from said transfer station, a platform member at said stacking station to receive successive crate-loads from said bearer means in superposed stacked relation, power energised means for moving said main carriage along said vertical guide members, control means for selectively arresting said main carriage at any of a plurality of heights above said platform member, power energised means for moving said secondary carriage along said horizontal guide means between said transfer and stacking stations, and means for positionally controlling a crate-load in a generally horizontal direction at said stacking station, comprising an upwardly extending barrier means disposed at one side of said stacking station to be engaged by one side of said crate-load on arrival, and a stop means at the opposite side of said stacking station to be engaged by the opposite side of said crate-load upon withdrawal of said bearer means from said crate-load.

References Cited in the file of this patent
UNITED STATES PATENTS

| | | |
|---|---|---|
| 2,703,653 | Thomson | Mar. 8, 1955 |
| 2,731,127 | Harrison | Jan. 17, 1956 |
| 2,768,756 | Horman | Oct. 30, 1956 |
| 2,870,922 | Thomson | Jan. 27, 1959 |
| 2,883,074 | Boehl et al. | Apr. 21, 1959 |